(12) United States Patent
Varadarajan

(10) Patent No.: US 7,277,879 B2
(45) Date of Patent: Oct. 2, 2007

(54) CONCEPT NAVIGATION IN DATA STORAGE SYSTEMS

(75) Inventor: Sundararajan Varadarajan, Troy, MI (US)

(73) Assignee: Electronic Data Systems Corporation, Plano, TX (US)

( * ) Notice: Subject to any disclaimer, the term of this patent is extended or adjusted under 35 U.S.C. 154(b) by 421 days.

(21) Appl. No.: 10/321,788

(22) Filed: Dec. 17, 2002

(65) Prior Publication Data

US 2004/0117341 A1 Jun. 17, 2004
US 2005/0283453 A9 Dec. 22, 2005

(51) Int. Cl.
G06F 17/30 (2006.01)
G06F 17/00 (2006.01)

(52) U.S. Cl. .................. 707/1; 707/2; 707/7; 707/9; 707/102; 707/103 Y

(58) Field of Classification Search ............... 707/103, 707/102, 1, 2, 7, 9, 103 Y
See application file for complete search history.

(56) References Cited

U.S. PATENT DOCUMENTS 6,026,410 A * 2/2000 Allen et al. ............... 707/104.1
6,029,171 A * 2/2000 Smiga et al. ............... 707/102
6,078,924 A * 6/2000 Ainsbury et al. ........... 707/101
6,111,578 A * 8/2000 Tesler ........................ 715/850
6,311,194 B1 * 10/2001 Sheth et al. ................ 715/505
6,421,678 B2 * 7/2002 Smiga et al. ............... 707/102
6,453,339 B1 * 9/2002 Schultz et al. ............. 709/206
6,618,733 B1 * 9/2003 White et al. ............ 707/103 Y
6,792,430 B1 * 9/2004 Kenyon et al. ............. 707/102
2003/0009517 A1 * 1/2003 Wang et al. ................ 709/203
2003/0030634 A1 * 2/2003 Sang'udi et al. ............ 345/418
2003/0126517 A1 * 7/2003 Givoni et al. ................. 714/46

* cited by examiner

Primary Examiner—Don Wong
Assistant Examiner—Thanh-Ha Dang
(74) Attorney, Agent, or Firm—Fish & Richardson P.C.

(57) ABSTRACT

Navigation among concepts in a free-form data object may be facilitated by using a text-mining tool to identify concepts in a free-form data object, with each concept having at least one concept instance. Using the identified concepts, a concept-navigable structure for the free-form data object may be generated. The concept-navigable structure may include links for navigating among concept instances and/or for jumping directly to a specific concept instance within the free-form data object.

20 Claims, 4 Drawing Sheets

200 ⟶

- <XML>
210 ⟶ <OriginalDocument><DOCUMENT> <TITLE>AMENDMENT/ADDENDUM TRACKING SHEET</TITLE> <P> Supplier Name: XYZ SERVICES_____</P> <P> </P> <P> Agreement Title: PROFESSIONAL SERVICES AGREEMENT_____</P> <P> </P>
<P> Agreement Effective Date: May 1, 1997_____</P>
<P> </P> <P> THIS PROFESSIONAL SERVICES AGREEMENT (the "Agreement"), dated May 1, 1997 (the "Effective Date"), is between XYZ SERVICES and ELECTRONIC DATA SYSTEMS CORPORATION, a Delaware corporation ("EDS").
</P> <P> </P> <P> W I T N E S S E T H: </P> <P> </P> <P> WHEREAS, EDS desires
205 ⟶ to have the right to obtain professional services from XYZ from time to time; and </P>
<P> </P> <P> WHEREAS, XYZ is willing to provide such services to EDS in accordance with the terms and conditions set forth in this Agreement; </P> <P> NOW, THEREFORE, in consideration of the premises, and other good and valuable consideration received and to be received, XYZ and EDS hereby agree as follows: </P>
<P> </P> <P> ARTICLE 1. TERM AND DEFINITIONS </P> <P> </P> <P> 1.1 Term. The term of this Agreement commences on the Effective Date and the Agreement shall continue to be in effect until terminated by either party as set forth in this Agreement.
</P> <P> </P>

<P> 6.1 Binding Nature Assignment and Subcontracting. This Agreement shall be binding on the parties and their respective successors in interest and assigns, but XYZ shall not have the power to assign or subcontract this Agreement without the prior written consent of EDS. </P>

</DOCUMENT></OriginalDocument> ⟵ 215
225 ⟶ - <CONCEPTS> ⟵ 240
      - <Assignment> ⟵
        <OFFLEN OFFSET="33822" LENGTH="280" /> ⟵ 265
        <AssignmtLanguage>6.1 Binding Nature Assignment and Subcontracting. This
220 ⟶ Agreement shall be binding on the parties and their respective successors in interest and assigns, but XYZ shall not have the power to assign or subcontract this Agreement ⟵ 235
        without the prior written consent of EDS.</AssignmtLanguage>
      </Assignment> ⟵ 245
      - <TermOfAgreement> ⟵ 255
220 ⟶   <OFFLEN OFFSET="8616" LENGTH="172" /> ⟵ 270
        <theTermOfAgreement>The term of this Agreement commences on the Effective Date and the Agreement shall continue to be in effect until terminated by either party as set ⟵ 250
        forth in this Agreement.<theTermOfAgreement>
      </TermOfAgreement>
230 ⟶ </CONCEPTS> ⟵ 260
      </XML>

FIG. 2 ll
CONCEPT NAVIGATION IN DATA STORAGE SYSTEMS

TECHNICAL FIELD

This description relates to searching for concepts in stored free-form data, and more particularly to navigating among concepts in a data storage system.

BACKGROUND

In virtually any large enterprise, there is an enormous amount of stored information, predominantly in the form of text. The amount of free-form or unstructured text data is typically very large when compared with structured data in databases. For example, free-form text data, on average, accounts for about 80% of the stored information and can frequently double every year. Structured data, on the other hand, accounts for only about 20% of the stored data. Much of the free-form text information, particularly in organizations such as legal, supply chain, human resources (HR), and the like, is contained in numerous large documents. Comprehending the terms and semantics to, for example, locate concepts of interest within a document requires a painstaking effort. Although electronic storage of documents simplifies the process of browsing through documents, it is difficult and time-consuming to browse through large volumes of text to understand and quickly locate the key semantic concepts of interest.

Most word processing software provides a mechanism for searching for individual terms but does not enable extraction of key semantic concepts from a large document. Recent advances in information extraction and text-mining technologies, however, provide mechanisms for extracting key semantic concepts. For example, one such text-mining engine that can extract semantic concepts is produced by ClearForest. Another example is APR Corporation's Smart Logik product.

SUMMARY

Techniques are provided for navigating among semantic concepts in large documents or other data records. These techniques use the output of a concept extraction engine to identify positional relationships among various concepts in a free-form data object. Concept instances can be highlighted, and links can be created among the concepts so that a user can navigate from one concept instance to a next/previous concept instance representing another or the same concept. In addition, links can be created so that a user can jump to a particular concept instance from a table of concepts. The user may also be able to select which concepts, from a list of concepts, are highlighted and/or have associated links. In one implementation, the techniques are implemented on a computer or web browser to allow a user to navigate among textual concepts in one or more large documents. In other implementations, the techniques may facilitate navigation among concepts in one or more voice recordings.

Unlike simple search engines, these techniques allow users to search or navigate among linguistic and semantic concepts within documents and provide the user with the flexibility to look at a variety of different highlighted concepts in one pass. In addition, unlike other text-mining tools, the user can navigate between each occurrence or concept instance and the successive or preceding occurrences of the same concept and can jump to a specific occurrence of any of the various concepts. Prior text-mining tools are designed primarily for browsing through the text-mining results of many small documents such as news articles, in which each document is likely to be only one page long and can be presented in its entirety on a screen. Such tools, when used with large documents (e.g., a legal contract that is tens of pages long), the user must scroll through the entire text to find occurrences of interest, which is a manually intensive, time-consuming, and error-prone process. The described techniques, on the other hand, address the navigation and location issue when performing semantic concept browsing in large documents by providing intuitive links embedded into the document.

In one general aspect, navigation among concepts in a free-form data object is facilitated by identifying concepts in a free-form data object. Each concept is presumed to have at least one concept instance. A concept-navigable structure for the free-form data object is generated from the identified concepts, such that the concept-navigable structure includes links for navigating among concept instances.

Implementations may include one or more of the following features. For example, each concept may be identified using semantic rules and/or linguistic rules. The free-form data object may also include at least one text-based document or at least one voice recording. The concept navigable structure may be generated by embedding the links within the free-form data object to allow navigation among adjacent concept instances and/or nearest associated concept instances (i.e., concept instances associated with the same concept). The concept-navigable structure can also be generated by sorting the concept instances according to position within the free-form data object to form a first sorted list, generating links between adjacent concept instances in the first sorted list, sorting the concept instances by concept to form a second sorted list, and generating links between concept instances in the second sorted list that are associated with the same concept. A table of concepts organized by concept and having links to each concept instance may be generated. A list of concepts associated with the free-form data object may be displayed, a user selection of at least one concept from the list of concepts may be received, and the concept instances corresponding to the user-selected concepts may be highlighted. The links may then facilitate navigation among the concept instances that correspond to the user-selected concepts.

In another general aspect, a concept navigation system includes a concept parser operable to receive concept instance data for concepts that are extracted from a free-form data object. The concept parser identifies a sequential relationship among concept instances and among concept instances associated with the same concept. A concept-navigable document structure generated by the concept parser contains navigation links for navigating among concept instances within the free-form data object.

Implementations of the system may include one or more of the following features. For example, the concept-navigable document structure may be accessible by a browser to allow a user to navigate among concept instances within the free-form data object. The concept-navigable document structure may also include navigation links for navigating from a current concept instance to a next or a previous concept instance or to a next or a previous associated concept instance (i.e., a concept instance associated with the same concept as the current concept instance). The concept-navigable document structure may include a table of concepts having links to each concept instance. The links may comprise pointers to anchor data associated with each concept instance. The concept parser may also be operable to receive concept instance data within an extensible markup language (XML) document, with the XML document identifying a location, length, and concept name for each concept instance. The XML document may be generated by a concept extraction tool.

In yet another general aspect, a computer-readable storage medium may store instructions for facilitating navigation among concepts in a free-form data object. A computer operating in accordance with the instructions may be operable to receive concept instance data relating to concepts within a free-form data object and to identify anchor data associated with each concept instance. Using the concept instance data, the computer may also generate links between each concept instance and a previous/next concept instance, if any, within the free-form data object. The links may comprise a pointer to the anchor data associated with the previous concept instance and the next concept instance. Finally, the computer may by operable to embed the links within the free-form data object to produce a concept-navigable document structure.

Implementations may include one or more of the following features. For example, the computer operating in accordance with the instructions may be further operable to generate additional links between each concept instance and any previous/next concept instance within the free-form data object that is associated with the same concept, and embed the additional links within the free-form data object. The computer may also be operable to generate a table of concepts listing the concepts and including links to each concept instance. The computer may be further operable to display the concept-navigable document to a user and enable the user to navigate among the concept instances using the links, the additional links, and the table of concept links.

The details of one or more implementations are set forth in the accompanying drawings and the description below. Other features will be apparent from the description and drawings, and from the claims.

DESCRIPTION OF DRAWINGS

FIG. 2 is an illustrative example of portions of an XML document generated by a concept extraction engine for use in connection with a concept navigation routine.

Like reference symbols in the various drawings indicate like elements.

DETAILED DESCRIPTION

A concept navigation routine is used to enable user-friendly navigation of semantic concepts that are identified by a concept extraction engine. Initially, a concept extraction engine is used to identify semantic concepts in a document. In particular, the locations of different concepts that are contained within the document are extracted by the concept extraction engine. The output of the concept extraction engine is parsed to generate a concept-navigable document structure. A user can then easily navigate among concepts in the concept-navigable document structure using a web browser. Although one implementation enables navigation among concepts in a textual document, it should be understood that the routine can be used to navigate among concepts in other types of electronically stored data, such as recorded voice data.

Figure 1:
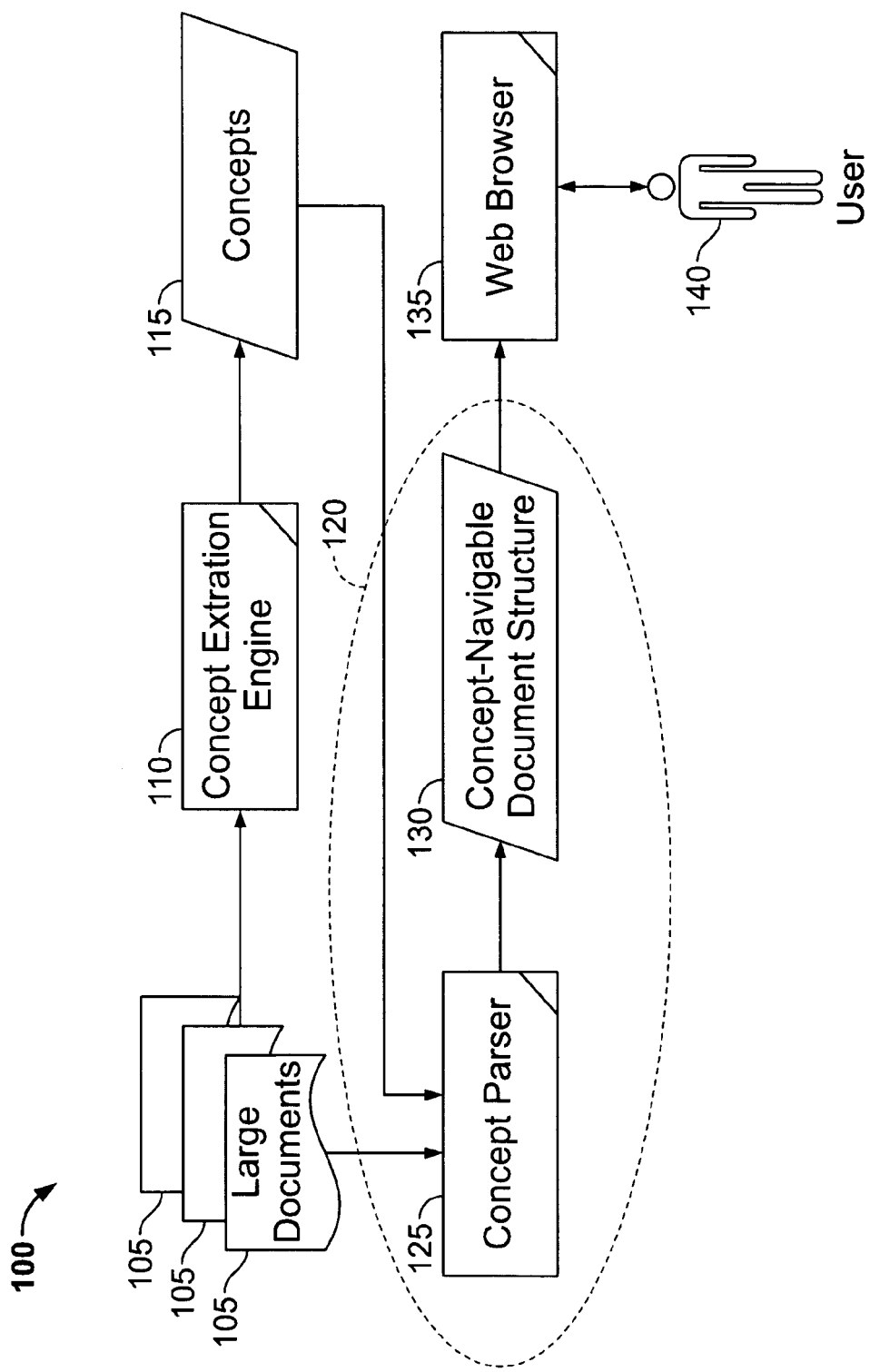
FIG. 1 is a block diagram of a system for implementing a concept navigation routine.

FIG. 1 is a block diagram of a system 100 for implementing a concept navigation routine. Initially, one or more large documents 105 are processed by a concept extraction engine 110 to extract one or more concepts 115. The concept extraction engine 110 may be a text-mining tool and may operate at a very simplistic level or at a more complex level. A simple instance of the concept extraction engine 110 is a regular, expression-based text search utility, such as the search utility provided by a word processor. A more complex concept extraction engine 110 makes use of thesaurus utilities and/or linguistic and domain-specific rules to extract concepts 115. One example of a concept extraction engine is the Clear Tags concept extraction engine available from Clear Forest Corp. of New York, N.Y. In either case, the concepts 115 that are output by the concept extraction engine 110 may be described in a well-defined format to facilitate implementation of the concept navigation routine.

In one implementation, the output of the concept extraction engine 110 is formatted as an Extensible Markup Language (XML) document, that contains the concept names and the location of the corresponding matching text within the original document. The elements of a representative XML document and their respective features are shown in Table 1 below. Depending on the type of concept extraction engine 110 used, the output may need to be transformed into a format similar to the described XML document. Other formats may also be used.

TABLE 1

| Element | Description | Parent | Value |
|---|---|---|---|
| Original Document | Contains the entire contents of the original document | Root | Text |
| Concepts | Contains information about concepts | Root | Sub-elements |
| Concept X, Concept Y, . . . | There will be one such element for every concept instance in the original document. This element contains the following location attributes at the minimum: Start Position Offset Length | Concepts | None required. Attributes as mentioned contain numerical values. |

FIG. 2 is an illustrative example of portions of an XML document 200 generated by the concept extraction engine 110. In this example, the original document represents a contract or agreement. The XML document 200 contains the entire original document 105 in an OriginalDocument element 205 between an OriginalDocument start-tag 210 and an OriginalDocument end-tag 215. The various concepts 115 are described in a Concepts element 220 between a Concepts start-tag 225 and a Concepts end-tag 230. The Concepts element 220 includes a number of sub-elements including, in this example, an Assignment sub-element 235 between an Assignment start-tag 240 and an Assignment end-tag 245, and a TermofAgreement sub-element 250 between a TermofAgreement start-tag 255 and a TermofAgreement end-tag 260. Each of the sub-elements 235 and 250 is further defined by a corresponding OFFLEN attribute 265 or 270 in an empty element. The OFFLEN attributes 265 and 270 describe the location of the respective sub-elements 235 and 250 in terms of their offset from the beginning of the document and their respective lengths in numbers of characters.

Each of the sub-elements 235 and 250 represents a concept instance. A particular concept 115 (e.g., TermofAgreement) may have multiple instances within a particular document 105. Different instances of the same concept 115 use identical start-tags and end-tags but have different locations and potentially different lengths. For example, the TermofAgreement sub-element 250 could be preceded within the Concepts element 220 of the XML document 200 by another TermofAgreement sub-element having a start-tag and an end-tag that are identical to the illustrated TermofAgreement start-tag 255 and TermofAgreement end-tag 260 but having different offset and length attribute values.

Referring again to FIG. 1, the output of the concept extraction engine 110 is received by a concept navigation system 120. In general, the concept navigation system 120 receives one or more documents 105 and information identifying the concepts 115 within each document 105 either as separate inputs or, as in the illustrative example of FIG. 2, contained in one XML document 200. The concept navigation system 120 includes a concept parser 125 that parses the concepts 115 and generates a concept-navigable document structure 130. The concept-navigable document structure 130 can then be accessed 140 through a web browser 135 by a user. In one implementation, the concept-navigable document structure 130 is a self-contained document that contains the original document 105 contents with appropriate highlighting of the text that corresponds to each concept instance and with information necessary for user-friendly concept-driven navigation within the document 105. For example, the concept-navigable document structure 130 may be an HTML document with highlighted text and embedded internal concept links. The internal concept links may include a table of concepts, links to jump to the next or previous instance of any concept from the current concept instance, and/or links to jump to the next or previous instance of the current concept type from the current concept instance.

Figure 3:
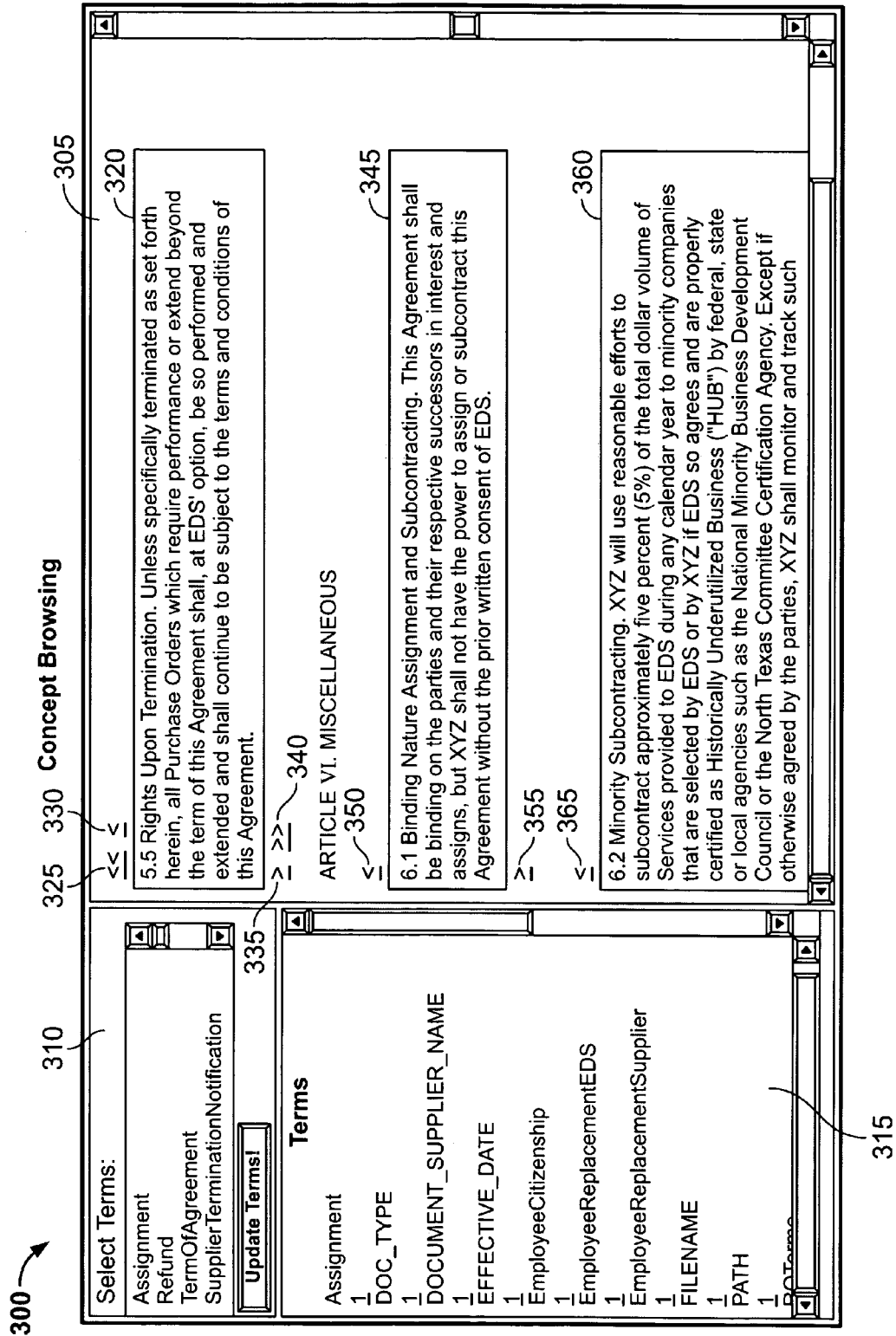
FIG. 3 is an illustrative interactive display of a concept-navigable document structure produced from the XML document of FIG. 2.

FIG. 3 is an illustrative interactive display 300 of a concept-navigable document structure 130 produced from the XML document 200 of FIG. 2 when viewed on a web browser 135. The display 300 includes a document display window 305, a concept selection window 310, and a table of concepts window 315. The document display window 305 contains the entire original document 105. The text that corresponds to each concept instance (i.e., anchor text) may be highlighted and may be preceded and/or followed by links to previous and subsequent concept instances. In this example, three different concept instances are displayed within the document display window 305—a "Termination" concept instance 320, an "Assignment" concept instance 345, and a portion of a "Supplier Reporting" concept instance 360.

The anchor text for each concept instance is preceded and followed by one or more links that are embedded within the concept-navigable document structure. These links allow a user 140 to navigate among concept instances in a convenient and user-friendly manner. For example, the "Termination" concept instance 320 is preceded by a previous concept instance link 325 (represented by "≪") and a previous concept link 330 (represented by "≦") and is followed by a next concept instance link 335 (represented by "≫") and a next concept link 340 (represented by "≧"). The previous concept instance link 325 and the next concept instance link 335 cause the display to jump to the anchor text associated with the previous or next concept instance of the same concept type. In other words, the display will jump to the next or previous "Termination" concept instance. If no previous and/or next concept instance of the same concept type is present, then no corresponding previous concept instance link 325 and/or next concept instance link 335 is displayed.

The previous concept link 330 and the next concept link 340 cause the display to jump to the anchor text associated with the previous or next concept instance of any concept type, which can be a concept instance of the same or a different type. For example, if a user 140 is viewing the Termination concept instance 320 and selects the next concept link 340, the display will jump to the "Assignment" concept instance 345, which is the next concept instance within the document 105. The first concept instance generally will not include a previous concept link 330, and the last concept instance generally will not include a next concept link 340.

The "Assignment" concept instance 345 does not include an associated previous concept instance link or an associated next concept instance link 335, which indicates that there are no other "Assignment" concept instances within the document 105. The "Assignment" concept instance 345 does include, however, a previous concept link 350 and a next concept link 355.

The illustrated portion of the "Supplier Reporting" concept instance 360 is preceded by a previous concept link 365. Depending on what types of concept instances, if any, are present in the document subsequent to the "Supplier Reporting" concept instance 360, the "Supplier Reporting" concept instance 360 could be followed by: (1) a next concept instance link and a next concept link (i.e., if the document includes another "Supplier Reporting" concept instance); (2) a next concept link (i.e., if the document does not include another "Supplier Reporting" concept instance but does include at least one concept instance of another type); or (3) no other links (i.e., if the "Supplier Reporting" concept instance 360 is the last concept instance in the document).

In one implementation, the interactive display 300 may provide some indication of the concept name (e.g., "Assignment", "Termination", and the like) when a cursor is moved over the anchor text. This indication may be provided, for example, in a pop-up window or in an information toolbar of the display 300. The anchor text for the various concept instances may be simultaneously highlighted so that a user can quickly locate multiple different concepts. In this case, adjacent concept instances may be highlighted in different colors to easily distinguish between the different concept instances. Alternatively, the concept instances may be highlighted one at a time based on which concept instance is currently selected. In addition, instead of embedding links within the text displayed in the document display window 305, implementations could include jump to next/previous navigation buttons in a toolbar of the display 300. In this case, the currently-selected concept instance may be highlighted in a different color than other concept instances. Another possible feature is to allow the user 140 to right click with a mouse in a specified region (e.g., on highlighted text) to bring up a menu with a list of concept names and instance numbers.

The concept selection window 310 may allow a user to select which concepts/concept instances are highlighted, displayed with links, and/or listed in the table of concepts window 315. The table of concepts window 315 displays a table of concepts. The table of concepts is similar to a table of contents except that, instead of the contents being described by sections and sub-sections, the contents are listed by semantic concept names, and each listed concept has associated links to each of the concept instances. In the illustrated example, each link is represented by a number designating an occurrence of the concept. Thus, the number "1" below a concept name represents a link to the first instance of that concept, while the number "2" would represent a link to the second instance of that concept. In response to selection of one of the links, the display jumps to the concept instance associated with the link.

The concept navigation system 120 may be implemented, for example, as a server-side Visual Basic (VB) Dynamic Link Library (DLL) or as a Java servlet in a Java 2 Platform Enterprise Edition (J2EE) environment. In a VB DLL implementation, an Active Server Pages (ASP) file may contain the HTML code, Javascript, and VBScript necessary to invoke the VB DLL; obtain from the VB DLL object on the server the HTML required for the contents of the document display window 305, the concept selection window 310, and the table of concepts window 315; and display the page to the user 140 in an appropriate format. An example of the code that may be contained in the ASP file is set forth in Appendix A.

In one implementation, when the concept navigation system 120 receives a request from a user to initiate a concept navigation routine, a user-selected concepts file name (i.e., an XML document name) is provided to the concept navigation system 120 through the ASP page. The user may also provide a list of concept names that are of interest by selecting certain concepts. If no list of concept names is provided, the concept navigation system 120 may assume that all concept names and instances are to be displayed. Based on these inputs, the concept navigation system 120 generates several outputs that are sent back to the ASP page. The outputs of the concept navigation system 120 include a list of all concepts in the document 105 and the selected concepts within the list. This list may appear in the concept selection window 310 of the display with the selected concepts highlighted. The concept navigation system 120 also outputs the table of concepts, which appears in the table of concepts window 315 as a list of selected concept names and the instance numbers for each selected concept with links to the anchor content in the document. Finally, the concept navigation system 120 outputs the document content with the embedded links and anchors.

Figure 4:
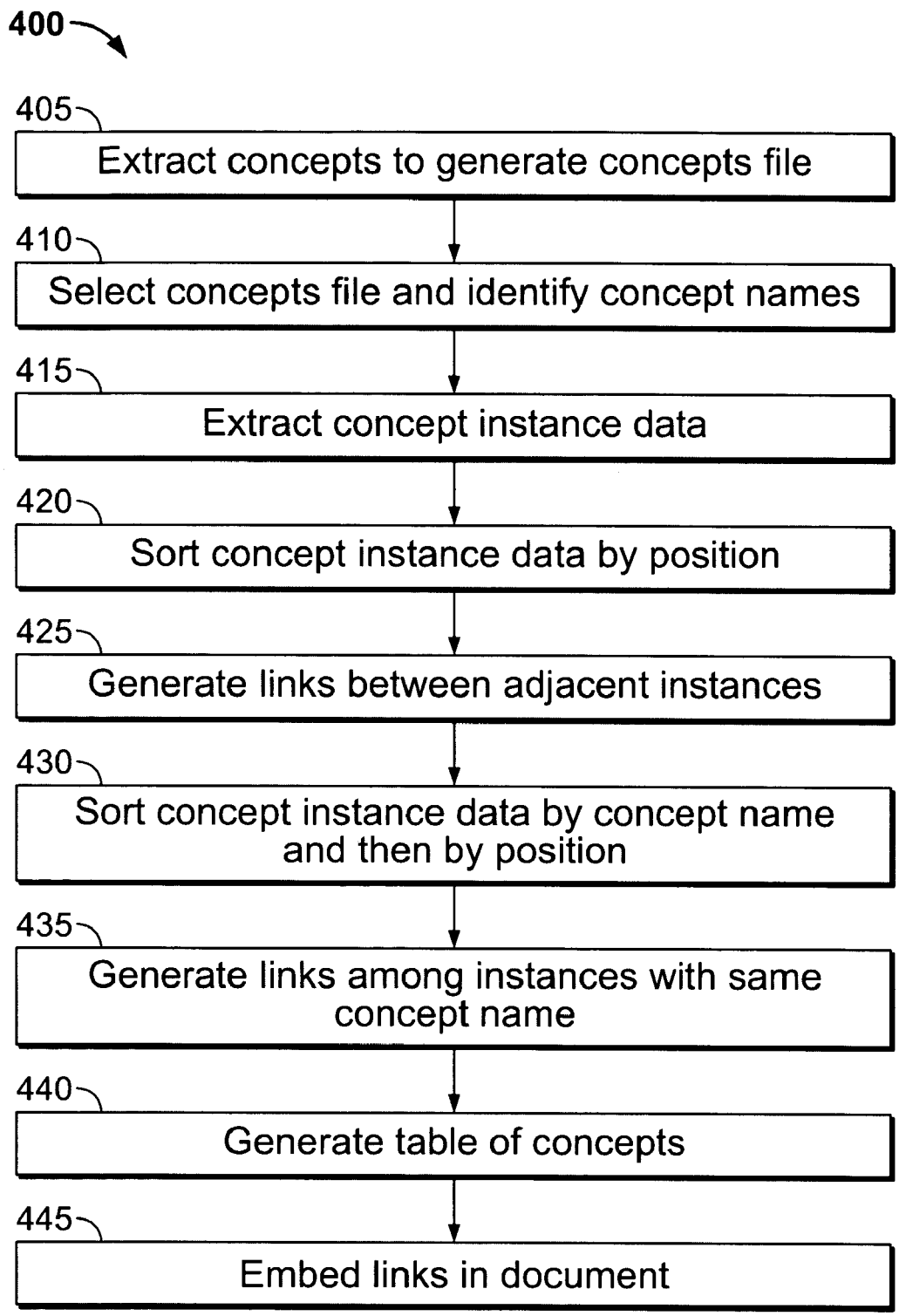
FIG. 4 is a flow diagram of a process for implementing a concept navigation routine.

FIG. 4 is a flow diagram of a process 400 that may be performed by the concept navigation system 120 to implement the concept navigation routine. Instructions for implementing the process may be stored on a computer readable storage medium. The process begins with an extraction of concepts from one or more documents 105 to generate a library of one or more concepts files (step 405). Generally, this extraction is performed by a concept extraction engine or text-mining tool, which may generate an XML document as described above. A user can then select a concepts file from the concepts file library and can optionally identify concept names that are of interest (step 410). Next, the selected concepts file is used to extract concept instance data (step 415). For example, a Microsoft XML Document Object Model within VB may be used to parse the XML document and to thereby populate a record set with the "Concept Name", "Offset", and "Length" attributes for each concept instance.

The concept instance data for the selected concepts is sorted by position (step 420). In other words, the data associated with each concept instance is sorted in a sequence of increasing "Offset" values. The sorted concept instance list is then processed to generate links between adjacent or sequential concept instances. A corresponding anchor name may be assigned as the concept name followed by the instance number (e.g., Assignment 1). For each concept instance, the text associated with the previous concept instance and the next concept instance in the sorted list is identified and associated with the appropriate link (i.e., $\leq$ or $\geq$). This processing allows the concept navigation system 120 to jump to the correct text whenever the previous concept link 330 or the next concept link 340 is selected. The previous concept instance and the next concept instance are respectively identified as the concept instance in the previous and the next record in the sorted list. The previous concept link 330 associated with the first concept instance in the sorted list and the next concept link 340 associated with the last concept instance are assigned a null value to indicate that no previous or next concept instance exists. Preferably, no link indication (i.e., $\leq$ or $\geq$) is displayed when the associated link has a null value. Finally, the processing involves determining the necessary HTML text required for highlighting the anchor text with a particular color.

After all of the links between adjacent concept instances are generated, the concept instance data is sorted first by concept name and then by concept instance position (step 430). For example, the concept instance date may be sorted alphabetically by concept name and then in a sequence of increasing "Offset" values for concept instances with the same concept name. This second sorted concept instance list is then processed to generate links among concept instances with the same concept name (step 435). For each concept instance, the text associated with the previous concept instance and the next concept instance having the same concept name are identified and associated with the appropriate link (i.e., $\leq\leq$ or $\geq\geq$). This processing allows the concept navigation system 120 to jump to the correct text whenever the previous concept instance link 325 or the next concept instance link 335 is selected. The previous concept instance and the next concept instance having the same concept name are respectively identified as the concept instance in the previous and the next record in the second sorted list if the previous and/or next record relate to a concept instance with the same concept name as the current concept instance. The previous concept instance link 325 associated with the first concept instance of a particular concept name and the next concept instance link 335 associated with the last concept instance of a particular concept name are assigned a null value to indicate that no previous or next concept instance with the same concept name exists. In general, no link indication (i.e., $\leq\leq$ or $\geq\geq$) is displayed when the associated link has a null value.

Next, the table of concepts is generated for the selected concepts (step 440). The table of concepts represents a list of the various concept names with one or more links to the corresponding anchor text. For each concept instance, the target of the link in the table of concepts is computed as the anchor text that corresponds to the anchor name. The concept names may be listed alphabetically or in the order in which the concepts first appear in the document, and the instance numbers may be listed as links. Finally, the links, anchors, and font text are embedded into the Original Document element 205 of the XML document 200 at the appropriate locations (step 445). These locations are determined by parsing the XML document object model to retrieve the original document text and then looping through each record in the concept data recordset to insert the HTML text at the appropriate locations.

Instead of using the concept navigation system 120 in connection with isolated documents, the system 120 can also be used in connection with a collection of documents. Referring again to FIG. 1, the concept extraction engine 110 is used to extract concepts from multiple documents 105. In one implementation, the concept extraction engine 110 produces an XML document 200 that includes multiple OriginalDocument elements 205 corresponding to the multiple documents 105. The XML document 200 further includes a Concepts element 220. The Concepts element 220 includes sub-elements corresponding to the various concept instances throughout the multiple documents 105. The sub-elements are further defined by attributes describing the length of the respective sub-elements, the location of the respective sub-elements in terms of offset from the beginning of the document 105 that contains the concept instance, and an identifier of the document 105 that contains the concept instance. Alternatively, the attributes may describe the length of the respective sub-elements and their location in terms of offset from the beginning of the collection of documents 105. The concept parser 125 receives the XML document 200 and generates a concept-navigable document structure 130 that includes links for navigating from a current concept instance to a next or a previous concept instance and to a next or a previous associated concept instance (i.e., a concept instance associated with the same concept as the current concept instance), even when the next or previous concept instance or the next or previous associated concept instance are in a different document 105 than the current concept instance.

In another implementation, the concept parser 125 can receive multiple XML documents 200 each corresponding to one of the documents 105 in the collection of documents. The concept parser 125 generates, from the multiple XML documents 200, a concept-navigable document structure 130 as described above (i.e., containing the text, concepts, and appropriate links associated with the entire collection of documents 105) or a sequence of linked concept-navigable document structures 130 such that each document structure 130 is linked to at least one other document structure 130 in the sequence. For example, the last concept instance in a particular document structure 130 may contain a pointer or link to the next document structure 130 in the sequence. Similarly, the last concept instance in a particular document structure may also contain a link or pointer to the next document structure 130 in the sequence that contains a concept instance associated with the same concept. Regardless of which implementation is used, the concept navigation system 120 can facilitate navigating among concepts in a collection of documents.

A number of implementations have been described. Nevertheless, it will be understood that various modifications may be made. For example, instead of navigating among concepts in an electronically stored text-based document, the techniques may be used to navigate among concepts in voice storage systems. Accordingly, other implementations are within the scope of the following claims.

APPENDIX A

```
<%Response.Buffer=True%>
<%
Dim reqXMLFile
Dim reqEventList
Dim conParse
```

APPENDIX A-continued

```
Dim xmlFile
Dim fullEventList
reqXMLFile = Request.QueryString("XMLFile")
reqEventList = Request.QueryString("eventList")
if(reqXMLFile = " ") then reqXMLFile = "test.xml" else reqXMLFile =
replace(reqXMLFile, "____"," ")
xmlFile = Server.MapPath(reqXMLFile)
Set conParse = Server.CreateObject("conParse17.ConceptParser")
call conParse.ProcessXMLDocument(xmlFile,reqEventList)
fullEventList = conParse.FullEventList
%>
<HTML>
<SCRIPT language="Javascript">
function getSelectedEvents( )
{
var esl = document.frmEventSelection.eventSelectionList;
var r=" ";
  for (var i = 0; i < esl.options.length; i++)
    if(esl.options[i].selected)
      r = r + esl.options[i].value +";";
return(r);
}
function updateEvents_onclick( ) {
document.frmEventSelection.action = "contents3.asp?XMLFile=" +
document.frmEventSelection.xmlFileName.value.replace(" ","____") +
"&eventList=" + getSelectedEvents( );
document.frmEventSelection.submit( );
}
</SCRIPT>
<HEAD>
<style type="text/css">
div.contents
{
width:690;
height:500;
overflow: scroll
}
</style>
<style type="text/css">
div.toc
{
width:280;
height:380;
overflow: scroll
}
</style>
</HEAD>
<BODY>
<%
Response.Write("<TABLE border1=1 width=""900"" height=""500"">"
& vbcrlf)
Response.Write(" <CAPTION><B> Concept Browsing
</B></CAPTION>" & vbcrlf)
Response.Write(" <TR>" & vbcrlf)
Response.Write(" <TD width=""150"" HEIGHT=""100"" VALIGN="
"TOP"">" & vbcrlf)
Response.Write(" <FORM name=""frmEventSelection"" METHOD="
"POST"">Select Terms:<BR>" & vbcrlf)
Response.Write(" <SELECT NAME=""eventSelectionList"
" MULTIPLE SIZE=4 >" & vbcrlf)
Dim curEventList
Dim curEvent
Dim curEventPos
Dim isSelected
Dim selectedText
curEventList = fullEventList
curEventPos = InStr(curEventList,";")
do while curEventPos > 0
  curEvent = Left(curEventList, curEventPos-1)
  isSelected = (reqEventList = " ") or (InStr(reqEventList,curEvent &
";") > 0)
  if isSelected then selectedText = "SELECTED " else selectedText = " "
  Response.Write(" <OPTION " & selectedText & "VALUE=" &
chr(34) & curEvent & chr(34) & ">" & curEvent & "</OPTION>" &
vbcrlf)
  curEventList = Mid(curEventList, curEventPos + 1)
  curEventPos = InStr(curEventList,";")
loop
```

APPENDIX A-continued

```
Response.Write(" </SELECT>" & vbcrlf)
Response.Write(" <INPUT TYPE=""BUTTON"" NAME="
"UpdateEventList""VALUE=""Update Terms!"" onClick="
"updateEvents_onclick( )"">" & vbcrlf)
Response.Write(" <INPUT TYPE=""HIDDEN"" NAME="
"xmlFileName"" VALUE=" & " " & reqXMLFile & " " & ">" & vbcrlf)
Response.Write("  </FORM>" & vbcrlf)
Response.Write(" </TD>" & vbcrlf)
Response.Write(" <TD VALIGN=""TOP"" ROWSPAN=""2"
" width=""700"" height=""500""WRAP=""=SOFT""><div class="
"contents"">" & conParse.Contents & "</div></TD>" & vbcrlf)
Response.Write(" </TR>" & vbcrlf)
Response.Write(" <TR>" & vbcrlf)
Response.Write("  <TD VALIGN=""TOP"" width=""280"" HEIGHT="
"380"" ><div class=""toc""><div ALIGN=""CENTER"
"><B>Terms</B></div>" & conParse.TOC & "</div></TD>" &
vbcrlf)
Response.Write(" </TR>" & vbcrlf)
Response.Write("</TABLE>" & vbcrlf)
%>
</BODY>
<%
Set conParse = Nothing
Response.End
%>
</HTML>
```

What is claimed is:

1. A computer-implemented method for facilitating navigation among concepts in a free-form data object, the method comprising:
automatically identifying concepts in a free-form data object, the free-form data object including a plurality of different concepts and each concept having one or more concept instances in the free-form data object, wherein automatically identifying concepts in the free-form data object includes automatically identifying the concept instances corresponding to the concepts;
generating a concept-navigable structure for navigating within the free-form data object, the concept-navigable structure associated with the free-form data object and configured to allow navigating among the automatically identified concept instances using the links in the concept-navigable structure, wherein generating the concept-navigable structure further comprises:
sorting the concept instances according to position within the free-form data object to form a first sorted list;
generating links between sequentially adjacent concept instances in the first sorted list;
sorting the concept instances in the first list according to concept to form a second sorted list; and
generating links between concept instances that are associated with the same concept in the second sorted list; and
embedding the links within the free-form data object to allow navigation among at least one of sequentially adjacent concept instances or concept instances associated with the same concept.

2. The method of claim 1 wherein each concept is identified using at least one of semantic rules and linguistic rules.

3. The method of claim 1 wherein the free-form data object comprises at least one text-based document.

4. The method of claim 1 wherein the free-form data object comprises at least one voice recording.

5. The method of claim 1 further comprising generating a table of concepts organized by concept and having links to each concept instance.

6. The method of claim 1 further comprising:
displaying a list of concepts associated with the free-form data object;
receiving a user selection of at least one concept from the list of concepts; and
highlighting the concept instances corresponding to the user selected concepts.

7. The method of claim 6 wherein the links facilitate navigation among the concept instances corresponding to the user selected concepts.

8. The computer-readable storage medium of claim 1 wherein sorting the concept instances to form the second sorted list includes sorting the concept instances according to position.

9. A computer-implemented concept navigation system comprising:
a concept parser software module stored on a memory of the concept navigation system, the concept parser software module configured to:
receive concept instance data for concepts extracted from a free-form data object, the free-form data object including a plurality of different concepts and each concept having one or more concept instances in the free-form data object;
automatically identify a sequential relationship among concept instances and among concept instances associated with the same concept;
sort the concept instances according to position within the free-form data object to form a first sorted list;
generate links between sequentially adjacent concept instances in the first sorted list;
sort the concept instances in the first list according to concept to form a second sorted list; and
generate links between concept instances that are associated with the same concept in the second sorted list; and
a concept-navigable document structure generated by the concept parser, the concept-navigable document structure associated with the free-form data object and containing navigation links for navigating among extracted concept instances within the free-form data object, and wherein the links are embedded within the free-form data object to allow navigation among at least one of sequentially adjacent concept instances or concept instances associated with the same concept.

10. The system of claim 9 wherein the concept-navigable document structure is accessible by a browser to allow a user to navigate among concept instances within the free-form data object.

11. The system of claim 10 wherein the concept-navigable document structure includes navigation links for at least one of:
navigating to a next and a previous concept instance from a current concept instance; or
navigating to a next and a previous concept instance associated with the same concept as the current concept instance.

12. The system of claim 11 wherein the concept-navigable document structure includes a table of concepts having links to each concept instance.

13. The system of claim 12 wherein the links comprise pointers to anchor data associated with each concept instance.

14. The system of claim 12 wherein the concept parser is configured to receive concept instance data within an extensible markup language (XML) document, with the XML document identifying a location, length, and concept name for each concept instance.

15. The system of claim 14 wherein the XML document is generated by a concept extraction tool.

16. The computer-readable storage medium of claim 9 wherein sorting the concept instances to form the second sorted list includes sorting the concept instances according to position.

17. A computer-readable storage medium storing instructions for facilitating navigation among concepts in a free-form data object, wherein a computer operating in accordance with the instructions is configured to:
   receive concept instance data relating to concepts within a free-form data objects, the free-form data object including a plurality of different concepts and each concept having one or more concept instances in the free-form data object;
   automatically identify anchor data associated with each concept instance;
   sort the concept instances according to position within the free-form data object to form a first sorted list;
   generate links between a selected concept instance and a previous concept instance and between the selected concept instance and a next concept instance in the first sorted list, wherein the links comprise a pointer to the anchor data associated with the previous concept instance and the next concept instance in the first sorted list;
   sort the concent instances in the first list according to concept to form a second sorted list;
   generate links between a selected concept instance and a previous concept instance and between the selected concept instance and a next concept instance in the first sorted list, where the selected concept instance, the previous concept instance and the next concept instance are associated with the same concept, and wherein the links comprise a pointer to the anchor data associated with the previous concept instance and the next concept instance in the second sorted list; and
   embed the links within the free-form data object to produce a concept-navigable document structure associated with the free-form data object, wherein the document structure allows navigation among at least one of sequentially adjacent concept instances or concept instances associated with the same concept.

18. The computer-readable storage medium of claim 17 wherein a computer operating in accordance with the instructions is further configured to:
   generate additional links between the selected concept instance and any concept instance within the free-form data object that is associated with the same concept; and
   embed the additional links within the free-form data object.

19. The computer-readable storage medium of claim 18 wherein a computer operating in accordance with the instructions is further configured to:
   generate a table of concepts listing the concepts and including links to each concept instance.

20. The computer-readable storage medium of claim 17 wherein a computer operating in accordance with the instructions is further configured to:
   display the concept-navigable document to a user; and
   enable the user to navigate among the concept instances using the links, the additional links, and the table of concept links.

* * * * *